Nov. 23, 1926.  
J. J. GRABFIELD ET AL  
1,607,671  
BRAKE TESTER  
Filed August 6, 1923
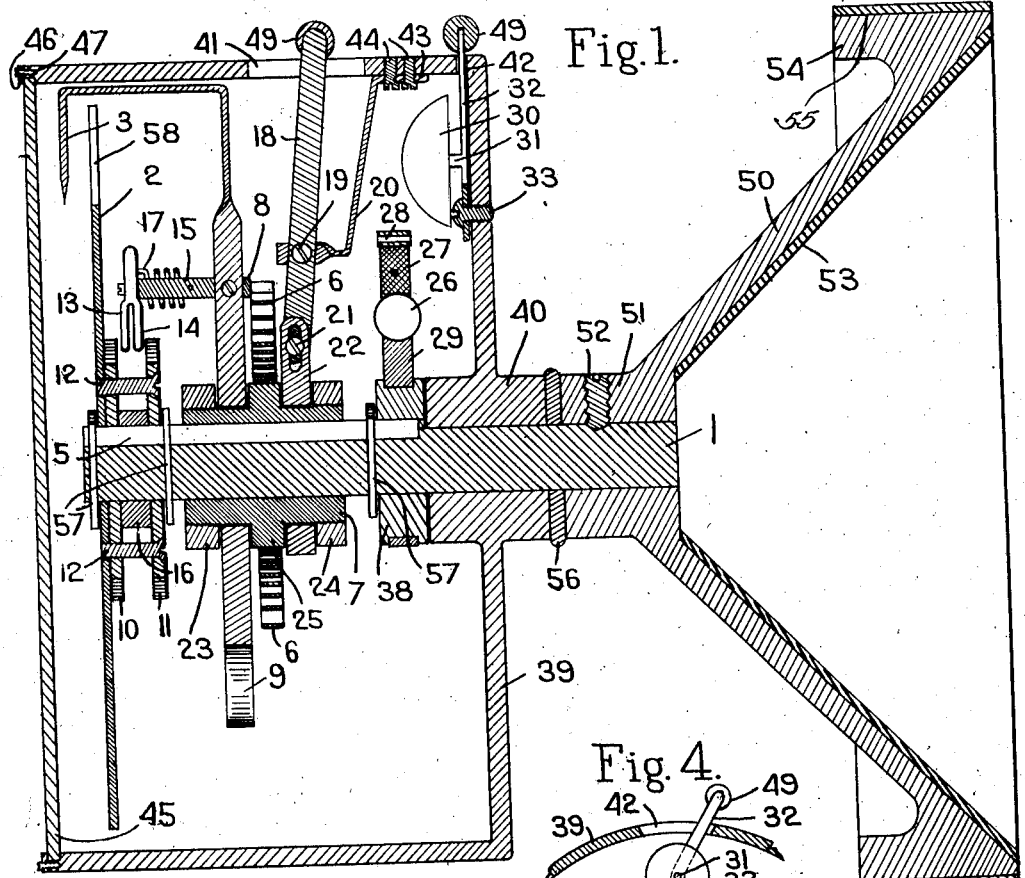
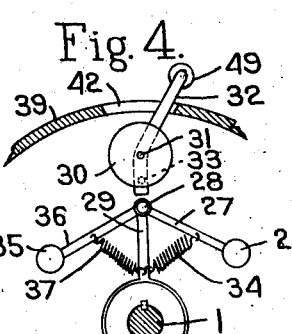
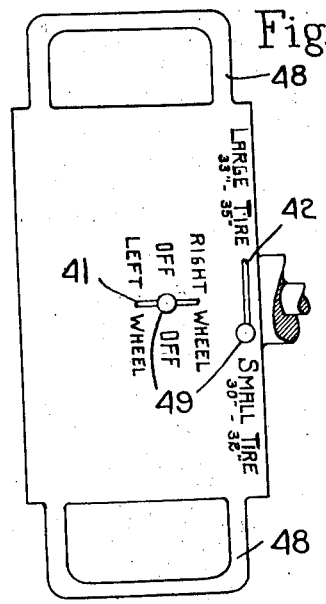
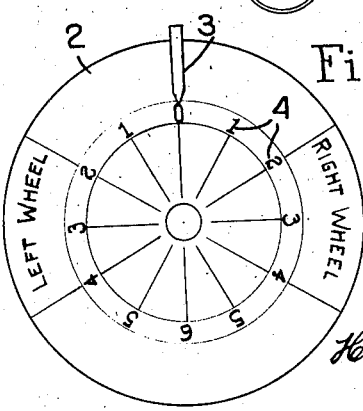
INVENTORS  
JOHN J. GRABFIELD  
FREDERICK A. KINCH JR.  
by  
Heard Smith & Tennant  
Attys.

Patented Nov. 23, 1926.

1,607,671

UNITED STATES PATENT OFFICE.

JOHN J. GRABFIELD, OF BRIGHTON, MASSACHUSETTS, AND FREDERICK A. KINCH, JR., OF WESTFIELD, NEW JERSEY.

BRAKE TESTER.

Application filed August 6, 1923. Serial No. 655,952.

This invention relates to a device for measuring the rate of change in speed of rotation of a revolving element, such device being of the type having two relatively movable members one member capable of being connected to the revolving element and having movement therewith, and the other member being rotatable independent of the revolving element but having means connected thereto which gradually retards and finally stops the movement of said member.

One of the objects of the invention is to provide such a device of novel design which may be applied to the end of a revolving element as a shaft and measure the rate of decrease in speed of rotation of the element.

A further object of the invention is to provide such a device which is simple in operation and construction and which is compact so that it may be easily supported and easily applied to a revolving element.

Another object of the present invention is to provide such a device which may be applied to any revolving element within the limits of the device.

A further and more particular object of the present invention is to provide such a device which may be applied to the hub of an automobile wheel to measure the rate at which the wheel is stopped or slowed down when the brakes are applied and thus measure the efficiency of the brakes.

Other objects and features of the invention will more fully appear from the following description and the accompanying drawings and will be particularly pointed out in the claims.

The drawings illustrate both in section and elevation a preferred form of construction of the device and embody the broad principles of the invention.

In the drawings:

Fig. 1 is a section longitudinally through the device, the weight of the indicating member being shown in side elevation and the ratchets 10 and 11 being shown broken out;

Fig. 2 is a plan view of the device with the coupling omitted;

Fig. 3 is a front elevation of the indicia-carrying dial and the pointer;

Fig. 4 is a detail of the speed-indicating device.

The mechanism illustrated is designed to be used in connection with any rotating element which may operate at various speeds to determine the rate of change in the speed of rotation of such element. The device in its present embodiment is particularly designed to be placed against the end of a revolving shaft which is decreasing its speed of rotation to determine the rate of decrease of speed and thus determine the efficiency of either the means which is increasing the speed of rotation of the element or the means which is decreasing such speed. It is particularly useful in testing the brakes of automobiles in which case the rear wheels of the automobile are lifted from the ground and then rotated by any means such as connecting the wheels with the motor of the automobile and after the wheels have reached a certain speed corresponding with a certain number of miles per hour at which the automobile would be travelling if the wheels were in contact with the ground, the wheels are suddenly disconnected from the driving force by means of the clutch and the brakes applied. During the time when the wheels are being driven the device is applied to the hub of the wheel to be tested and when the brakes are suddenly applied to the wheels the instrument registers the speed with which the brakes stop the revolution of the wheels. In this way the brakes of automobiles may be conveniently tested in a garage or other place without being taken on the road for a road test.

One of the features of the invention is the particular form of coupling by means of which the instrument may be coupled to the hub of the revolving wheel. The coupling is in the form of the frustrum of a cone, the base of the frustrum being that part of the coupling which is outside. When it is impossible to connect the instrument with the end of a revolving shaft or with the hub of the wheel to be tested, the coupling may be placed against the periphery of the revolving element and register any change in speed of rotation in the element as though it were connected in the preferred manner.

As illustrated herein the device comprises a shaft 1, an indicia-carrying member 2 and and an indicating member 3 both mounted on the shaft in such a manner that they may have movement relative to one another. One of the members is preferably rigidly fixed to the shaft and the other is mounted on a shaft so that it may have movement independent thereof. As shown in the drawings the indicia-carrying member is in the form of a disk having thereon the indices 4 and is fixed to the shaft by means of a key 5. The indicating member is preferably in the form of a pointer loosely embracing the shaft for free rotation thereon but connected to the shaft by some means, such as a spring 6 in such manner that the pointer may have movement past the disk. In the preferred form of the construction a sleeve 7 is fastened to the shaft for rotary movement therewith and the indicating member is loosely mounted on the sleeve while the spring is fastened at the outer end to the pointer and at the inner end to the sleeve. The spring may conveniently be connected to the pointer by means of an arm 8 which projects from the pointer and to which the outer end of the spring is fastened. A counterweight 9 is provided on the end of the indicating member in order to counterbalance the weight of the indicating member and attached parts.

In order to retain the indicating member and the indicia-carrying member in their positions of farthest relative movement a pair of ratchets 10 and 11 having opposed teeth are fastened to the shaft by means of the key 5 and to the disk by means of screws 12. The ratchets co-operate with a pair of pawls 13 and 14 carried on an arm 15, which may conveniently be a continuation of the arm 8, in such a manner that either pawl may be made to engage with the appropriate ratchet. To this end the ratchets 10 and 11 are spaced apart by a washer 16 and the pawls 13 and 14 are held in the space between the ratchets. A spring 17 fastened to the arm 15 engages the pawls to yieldingly retain them in engagement with the teeth of the ratchets when said pawls are moved into operative position. By the use of two pawls and ratchets operating in opposite directions the device may be used in conjunction with elements which are revolving in either direction by causing either one or the other of the pawls to engage with its ratchet.

To move the pawls into operative position the sleeve 7 is splined to the shaft for movement longitudinally thereof so that when the sleeve is moved in one direction along the shaft the pawl 13 may be made to engage with the ratchet 10 and when the sleeve is moved in the other direction along the shaft the pawl 14 may be made to engage with the ratchet 11. The sleeve may be moved in any suitable manner as by a lever 18 fulcrumed at 19 to a stationary support 20 with one end projecting to the outside of the instrument and the other end fastened by a sliding connection 21 to a collar 22 which surrounds the sleeve in such a manner that the sleeve may revolve within it. Thus by moving the outer end of the lever 18, the collar 22 and indicating member 3 are moved to cause either pawl to engage with the appropriate ratchet.

In order to retain the indicating member and the collar 22 on the sleeve and transmit motion from the collar to the indicating member rings 23 and 24 or other suitable means are removably fastened on the ends of the sleeve which is preferably formed with a shoulder 25. This shoulder separates the indicating member and the collar and the spring 6 may conveniently be fastened to the sleeve by being secured to the shoulder 25, thus freely operating in the space between the indicating member and the collar 22.

It will be seen that when the shaft 1 is rotated, the disk 2 is moved with the shaft and the indicating member is also carried with the shaft due to the engagement of the pawl carried by the indicating member with the ratchet carried by the shaft. When the shaft stops the indicia-carrying member stops at the same instant but the indicating member continues its rotary movement until it is finally brought to rest by the tension of the spring which connects said member to the shaft, the pawl meanwhile slipping over the teeth of the ratchet until the indicating member comes to rest. At this time the pawl engages with the nearest tooth on the ratchet to hold the indicating member in the position at which it comes to rest. Thus if the shaft be connected to a revolving element which suddenly stops, the shaft and disk also suddenly stop but the indicating member continues its rotary movement until the spring brings it to rest.

The distance to which the indicating member will move relative to the disk depends upon the speed with which the shaft was revolving and its rate of change of speed when coming to rest and, also upon the characteristics of the spring. Since in a given instrument the characteristics of the spring are constant, the distance to which the indicating member will move past the disk is determined by the speed of rotation of the shaft disk and indicating member and the quickness with which the rotation of the disk and shaft are stopped. Therefore, if the second condition, namely the speed of rotation prior to any change in speed, is the same during a series of tests with the instrument and the rate of change of the speed of rotation is varied, the indicating member will move past the indicia-carrying member a distance depending upon the rate at which the speed of rotation is changed. Thus if the instrument is applied to the end of a shaft which is rotating at a certain speed and the shaft is suddenly stopped, the indicia-carrying member will move past the disk to a point depending upon the rate of change of speed of rotation. If the shaft is again brought to the same speed and is stopped, but not quite as suddenly as it was in the first test, the pointer will not move quite as far past the disk as in the first test, and will register a rate of change in speed of rotation which will be less than the rate of change in the first test. If brakes are used to change the speed of rotation the distance which the indicating member moves past the disk is then a measure of the rate at which the brakes stop the rotation of the shaft and is thus a measure of the efficiency of the brakes.

In order to determine the speed of rotation of the revolving element to be tested a speed indicator is provided in conjunction with the tester and is actuated by one of the moving parts of the tester. Such speed indicator is preferably a ball 26 carried on an arm 27 which is pivoted at 28 to a second arm 29 fastened to the shaft 1 and a bell 30 against which the ball may strike. Thus when the shaft is revolving the centrifugal force throws the ball 26 outwardly and enlarges the radius of the circle through which the ball moves. The faster the shaft revolves the greater will be the radius of the circle. The bell 30 is held in such a position that it may be moved into and out of the path of the ball 26 so that every time the shaft rotates the ball will ring the bell, provided the shaft is rotating at such a speed that the centrifugal force will throw the ball outwardly into such a position that it hits the bell. Thus the position to which the bell must be moved before it is struck by the revolving ball will indicate the speed of revolution of the shaft and the slower the speed of revolution the nearer the bell will have to be to the center of the shaft 1 before the ball will strike the bell. The bell may be supported in any suitable manner. As shown herein the bell is held on a post 31 which extends from an arm 32. The arm is pivoted at 33 in such a position that movement of the arm will bring the bell either closer to or farther away from the center of the shaft 1. The distance to which the ball will be thrown may be governed by placing a suitable spring 34 between the arms 27 and 29.

We have herein shown the device as comprising a second ball 35 on an arm 36 which is also pivoted at the point 28 and controlled by a spring 37. The arm 29 may be fastened to the shaft in any suitable manner and as shown on the drawings said arm 29 is fastened to a collar 38 which in turn is fastened to the shaft by means of the key 5.

The mechanism of the tester is enclosed in a casing 39 having a projecting boss 40 which forms a bearing for the shaft 1. The casing is provided with a slot 41 through which the end of the lever 18 projects and also with a slot 42 through which projects the arm 32. The pivot 33 may conveniently be a screw which is screwed into the casing to retain the bell thereon. The casing may also serve as a means to hold the support 20 and to that end the support is provided with a flange 43 which is held against the casing by screws 44.

The front of the casing is provided with transparent material 45 in order that the relative positions of the indicia-carrying member and the indicating member may be observed. Such transparent material may be glass or celluloid but is preferably a substance which will not easily be broken during the rough usage to which the tester will be subjected. The transparent material may be removably retained in place by a ring 46 of such a size that it overlies the edge of the material and is fastened to the edge of the casing by spaced screws 47 after the material has been put in place. Handles 48 are preferably fastened to the periphery of the casing for the convenient holding of the tester when it is used. Directions for the use of the instrument may be stamped on the casing near the slots 41 and 42 to indicate the uses of the lever 18 and arm 32 and knobs 49 may be fastened on the ends of the lever and arm for the convenience of the operator.

A novel form of coupling has been used in order to couple the indicator with rotating elements of various sizes. The coupling comprises a member 50 shaped like the frustrum of the cone with a portion of greatest diameter extending outwardly and a portion of smallest diameter joining an apertured sleeve 51 which projects therefrom to receive the end of the shaft in any suitable manner as by a screw 52 threaded through an opening in the sleeve and engaging the shaft.

The member 50 is faced with a material 53 such as rubber which will firmly engage without slipping the end of a revolving shaft or other element and drive the testing device at the same speed as the revolving shaft. It will be seen that with this coupling any shaft having a diameter between the large and the small diameters of the frustrum of the cone may be connected to the testing device and when the coupling is placed against the end of the revolving element said coupling will automatically be centered on the revolving element.

In case the device cannot conveniently be applied to the end of the revolving element the member 50 is provided with a horizontal portion 54 which is covered with a friction material 55 so that when the device is held against the periphery of a revolving element, the material 55 will frictionally engage with the element and drive the tester through the coupling. In this case it is obviously necessary that the speed of the revolving element as indicated by the speed indicator be corrected for the different relative diameters of the revolving element and the periphery of the coupling. A suitable bearing plate 56 may be placed between the portion 40 and the end of the sleeve 51 in order to take the thrust of the coupling against the casing.

The various parts and units of the device may be held in their relative positions on the shaft by any suitable means such as cotter pins 57, and the indicia-carrying disk 2 may be provided with a slot 58 to permit it to move past the pointer when it is desired to remove the disk from the shaft for purposes of repairing the mechanism.

From the above description it will be seen that a novel and extremely useful device has been provided to indicate the rate of decrease in speed of rotation of a revolving element and that the device is particularly useful to determine the efficiency of the brakes in an automobile. The device may be used on either wheel and due to its novel coupling may be connected to the wheels of an automobile having hub caps of different diameters. Although a particular and preferred form of the invention has been described modifications may be made and the invention is to be construed as broadly as the limitations in the claims, taken in conjunction with the prior art, may allow.

Having thus described the invention, what is claimed as new and desired to be secured by Letters Patent, is:

1. A device for measuring the rate of decrease in speed of rotation of a revolving element comprising a shaft, an indicia-carrying member fast thereon, a weighted indicating member mounted co-axially with the shaft, a one-way clutch for positively driving the indicating member from the shaft, means interposing a yielding resistance to any movement of the indicating member in advance of the shaft, and a coupling member for connecting the shaft to the revolving element, whereby when the revolving element is so connected and the speed of said revolving element is decreased the indicating member will have a forward rotation relative to the indicia-carrying member, the extent of which will be determined by the yielding resistance.

2. A device for measuring the rate of decrease in speed of rotation of a revolving element comprising a shaft, an indicia-carrying member fast thereon, a weighted indicating member mounted co-axially of the shaft, a one-way clutch for positively driving the indicating member forwardly from the shaft, a spring yieldingly resisting forward turning movement of the indicating member relative to the shaft, and means for coupling the shaft to the revolving element, whereby when the revolving element is connected to the shaft and the speed of said revolving element is decreased the indicating member will have a movement relative to the indicia-carrying member.

3. A device for measuring the rate of decrease in speed of rotation of a revolving element comprising a shaft, an indicia-carrying member rigid therewith, a weighted indicating member mounted co-axially of the shaft, a pawl and ratchet driving connection between the shaft and the indicating member, a spring to resist yieldingly forward turning movement of the indicating member relative to the shaft, and a coupling member for connecting the shaft to the revolving element, whereby when the revolving element is connected to the shaft and the speed of said revolving element is decreased the indicating member will have a movement relative to the indicia-carrying member.

4. A device for measuring the rate of decrease in speed of rotation of a revolving element comprising a shaft, an indicia-carrying member fast thereon, a weighted indicating member loosely mounted thereon, a pawl and ratchet driving connection between said weighted indicating member and shaft, a spring connecting said indicating member to the shaft, and arranged to resist yieldingly forward movement of the indicating member relative to the shaft, and means for coupling said shaft to the revolving element, whereby when the speed of the revolving element is decreased the indicating member moves forwardly relative to the indicia-carrying member.

5. A device for measuring the rate of decrease in speed of rotation of a revolving element comprising a shaft, an indicia-carrying member fast thereon, a weighted indicating member loosely mounted on the shaft, means to drive the indicating member forwardly by the forward rotation of the shaft, said indicating member being permitted to turn forwardly relative to the shaft, a spring yieldingly resisting such relative forward movement, and means for coupling the shaft to the revolving element.

6. A brake tester for measuring the efficiency of a brake in stopping the motion of a revolving element comprising a shaft, an indicia-carrying disk fast to the shaft. a ratchet fast to the shaft and to the disk. a weighted pointer loosely mounted on the shaft, a pawl carried by the pointer for engagement with the ratchet, a spring connecting the pointer to the shaft, and a coupling for connecting the shaft to the revolving element, whereby when the revolving element is connected to the shaft and the speed of the shaft is reduced, the pointer due to its momentum moves past the disk and is retained at its farthest point of movement by the engagement of the pawl with the ratchet thereby indicating the rate of decrease of the speed of the revolving element.

7. An automobile brake tester for measuring the efficiency of a brake in stopping the motion of a revolving wheel comprising a shaft, an indicia-carrying disk fast to the shaft, two ratchets having opposed teeth fast to the shaft and to the disk, a weighted pointer loosely mounted on the shaft, two pawls carried by the pointer, means to place either pawl in engagement with its ratchet, means carried by the pointer to retain each pawl in engagement with the corresponding ratchet, a spring connecting the pointer to the shaft, and a coupling for connecting the shaft to the hub of the revolving wheel, whereby when a wheel revolving in either direction is connected to the shaft and the brakes applied to stop the motion of the wheel, the pointer due to its momentum moves past the disk and is retained at its farthest point of movement by the engagement of the appropriate pawl with the corresponding ratchet thereby indicating the rate of decrease of the speed of the wheel and the efficiency of the brake.

8. A device such as described in claim 1 in which the coupling is a hollow conical member secured to the shaft, with an interior conical facing of material to frictionally engage the end of the rotating element, whereby the coupling may be applied to rotating elements of various sizes.

In testimony whereof, we have signed our names to this specification.

JOHN J. GRABFIELD.
FREDERICK A. KINCH, Jr.